United States Patent [19]
Wilson

[11] 3,921,477
[45] Nov. 25, 1975

[54] DEVICES WITH SLIDE-ACTION-ARTICULATED GRIPPING AND/OR CUTTING MEMBERS

[75] Inventor: Michael C. Wilson, Glen Ellyn, Ill.

[73] Assignee: Plus Four, Inc., Wheaton, Ill.

[22] Filed: Oct. 18, 1974

[21] Appl. No.: 516,074

[52] U.S. Cl. .................................. 81/128; 30/241
[51] Int. Cl.² ......................................... B25B 13/18
[58] Field of Search ........ 81/128, 129, 151; 30/182, 30/185, 241, 243

[56] References Cited
UNITED STATES PATENTS
1,539,494  5/1925  Kimball ............................... 81/128

Primary Examiner—Al Lawrence Smith
Assistant Examiner—James G. Smith
Attorney, Agent, or Firm—Johnston, Keil, Thompson & Shurtleff

[57] ABSTRACT

Devices useful as wrenches, long reach retrievers, surgical tools, shears, clamps, and the like embodying two gripping and/or cutting members slidable along acute-angled relative axes and jointly articulated by slot and pin means upon sliding articulation of one of the members.

2 Claims, 15 Drawing Figures

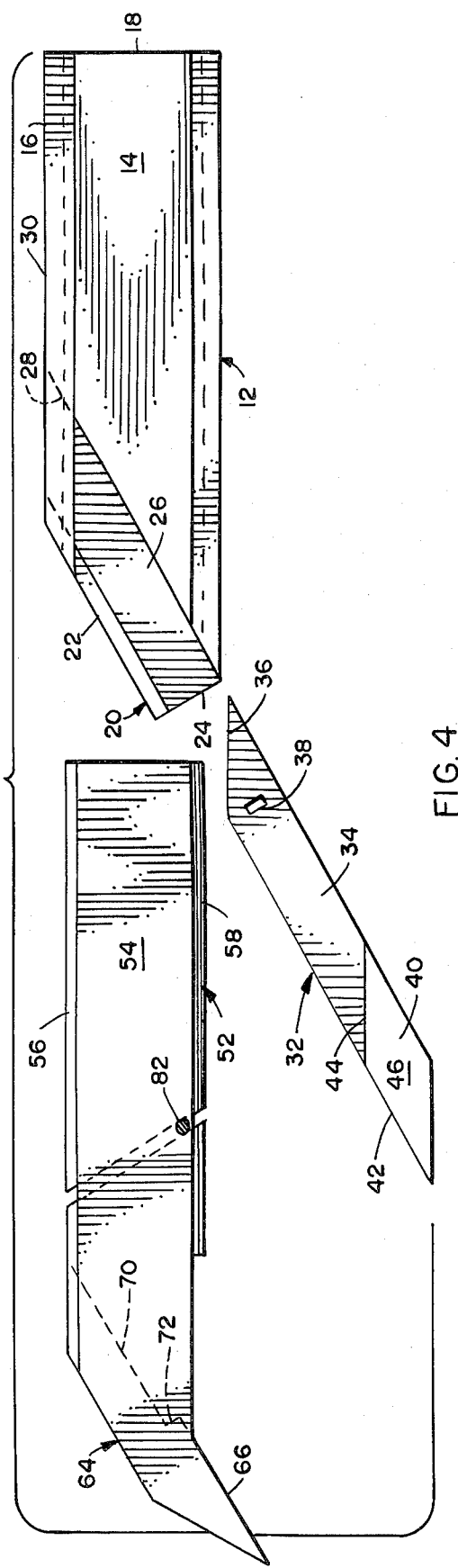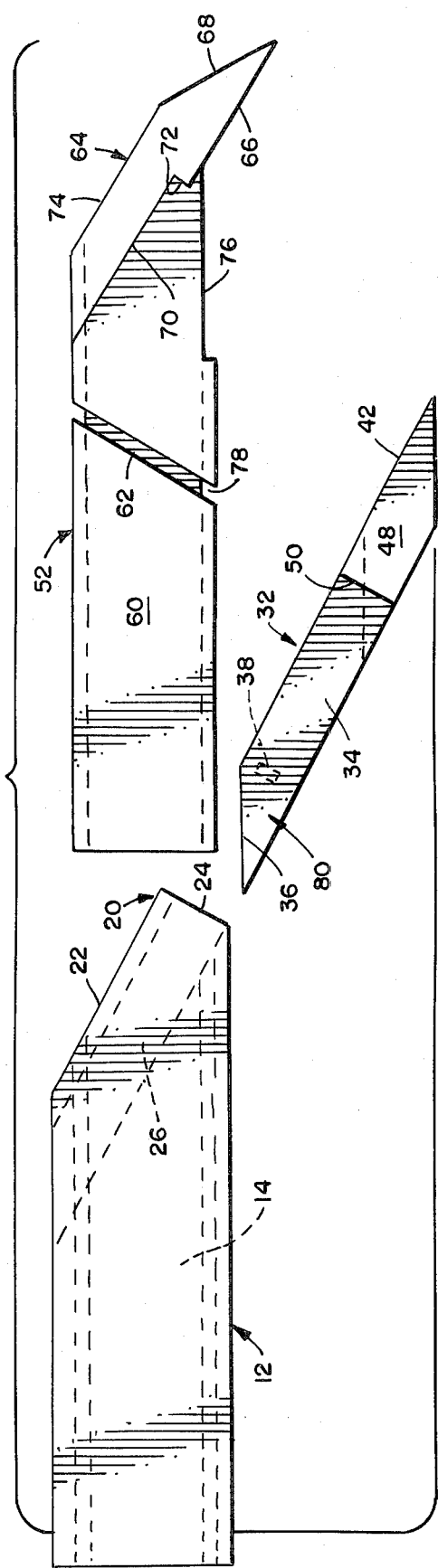

DEVICES WITH SLIDE-ACTION-ARTICULATED GRIPPING AND/OR CUTTING MEMBERS

This invention relates to novel gripping and/or cutting devices useful as wrenches, long-range retrievers, surgical tools, shears, clamps, and like devices wherein an object is to be gripped or held between adjustable, substantially opposed jaws and/or sheared by coacting blades. The invention provides new concepts and structures for attaining the articulation of such jaw or blade members by (1) effecting the articulation of both members by sliding movement of each at an acute, relative angle (2) preferably while maintaining the substantially opposed relationship of the gripping faces of the jaws as the distance therebetween is adjusted and (3) attaining the articulation of both members by sliding movement imparted to only one jaw-bearing member.

Prior disclosures of gripping devices useful as wrenches utilizing slide movement of one or both jaws are found in Bourne U.S. Pat. No. 1,034,341; Norwood U.S. Pat. No. 1,335,293; Carpenter U.S. Pat. No. 1,551,085; and Salvucci U.S. Pat. No. 1,616,871. Bourne discloses a wrench with a double pin-double slot arrangement for its movable jaw to allow grip and release of pipe when teeth on the handle are engaged and disengaged with teeth on the movable jaw. Norwood shows a single slot-pin adjustable pipe wrench with the arm of a linearly movable jaw slidable in a track. Carpenter shows a wrench with a screw thread in the handle for adjusting the jaw with two slots (FIG. 4) in which a pin 27 rides. The articulation in this wrench, however, is greatly different from that of the invention herein. The wrench of Salvucci has its movable jaw slidable in a pair of opposed channels, the bottom walls of which are connected by a longitudinal wall. A guide pin slides in the slot. The handle contains a pair of transverse aligning slots. The articulation of the Salvucci wrench by pivotable movement of the handle is significantly different from the jaw articulation of the subject invention.

BRIEF DESCRIPTION OF THE INVENTION

This invention concerns gripping and/or shearing (cutting) devices with sliding articulation of the two jaw-bearing or blade-bearing members thereof. It embodies a base, preferably though not necessarily functioning as a handle. A first jaw-bearing or blade-bearing member is longitudinally slidably mounted on the base. A second jaw-bearing or blade-bearing member is slidably mounted on the base at an acute diagonal angle relative to the direction of longitudinal movement of said first member. There are opposed, gripping faces on respective jaw-bearing members. The blades have a guillotine or scissors arrangement and may also be made to grip objects under light gripping pressure insufficient to shear or cut the object. An articulation means is operatively associated with the members to move the second member diagonally relative to the first member and toward and away from said base as the first member is slid longitudinally relative to the base in a predetermined movement relationship of said members maintaining the gripping faces in substantially opposed relationship while varying the distance between said faces or moving the blades in shearing proximity across each other. The above-discussed articulation means preferably comprises slot means substantially at 90° relative to said diagonal angle in one of the members and follower means, e.g., a pin, on the other member and slidably riding in the slot means.

The aforesaid diagonal angle for the second member's linear movement preferably is approximately 30° relative to the direction of longitudinal movement of the first member. The gripping faces of the jaw-bearing members preferably are substantially parallel to said diagonal angle. The shearing edges of the blades may be parallel to each other but usually lie at an acute angle to each other. The first member preferably comprises a bar longitudinally slidably mounted on the base. The bar has a flat face. The slot means preferably is a straight groove extending diagonally in the flat face at an angle of approximately 60° relative to the longitudinal axis of the bar. Uniquely, some of the preferred forms of the invention have an exposed side or face on the bar adapted for thumb engagement to impart sliding movement thereto.

THE DRAWINGS

Preferred embodiments of the invention are illustrated in the drawings, wherein.

Figure 1:
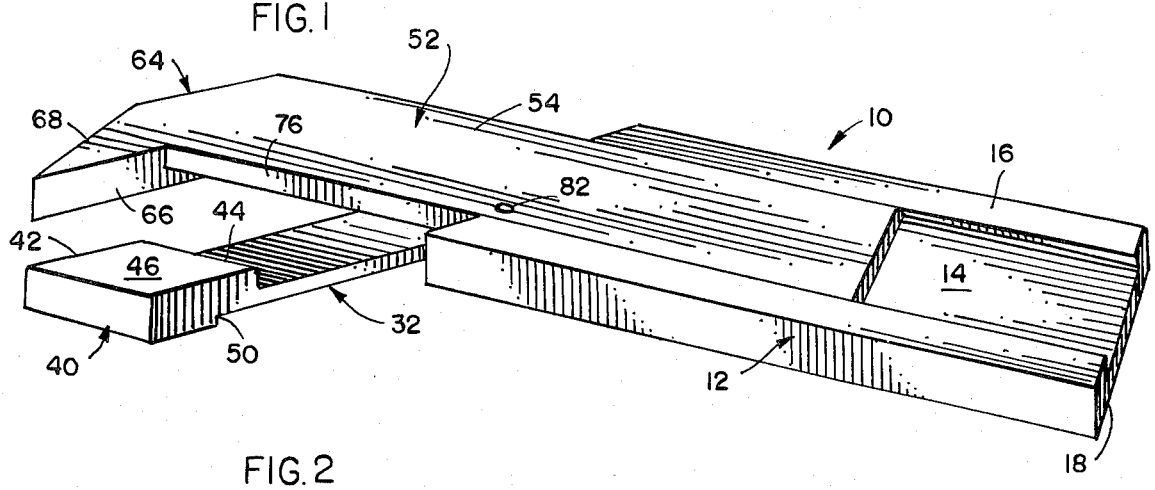
FIG. 1 is a front, perspective view of a wrench species of the invention.
Figure 2:
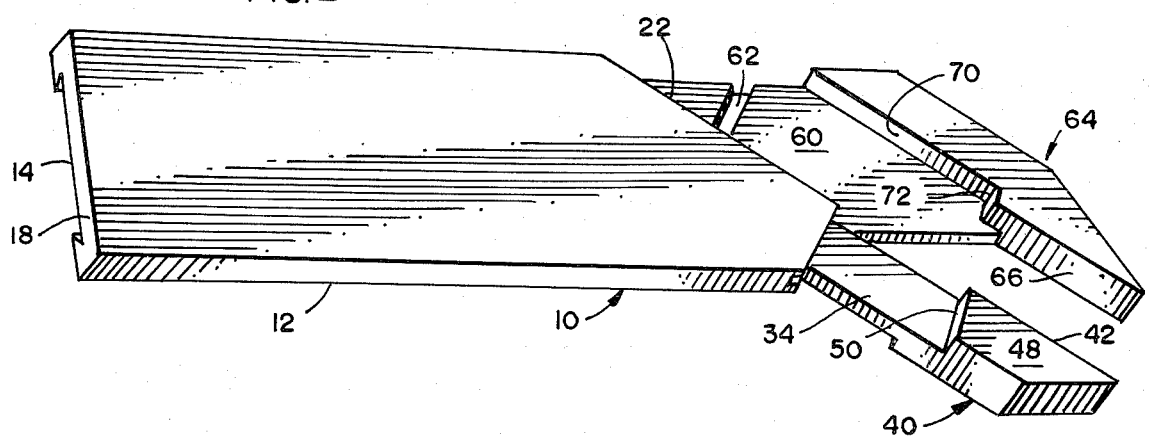
FIG. 2 is a rear, perspective view thereof.
Figure 5:
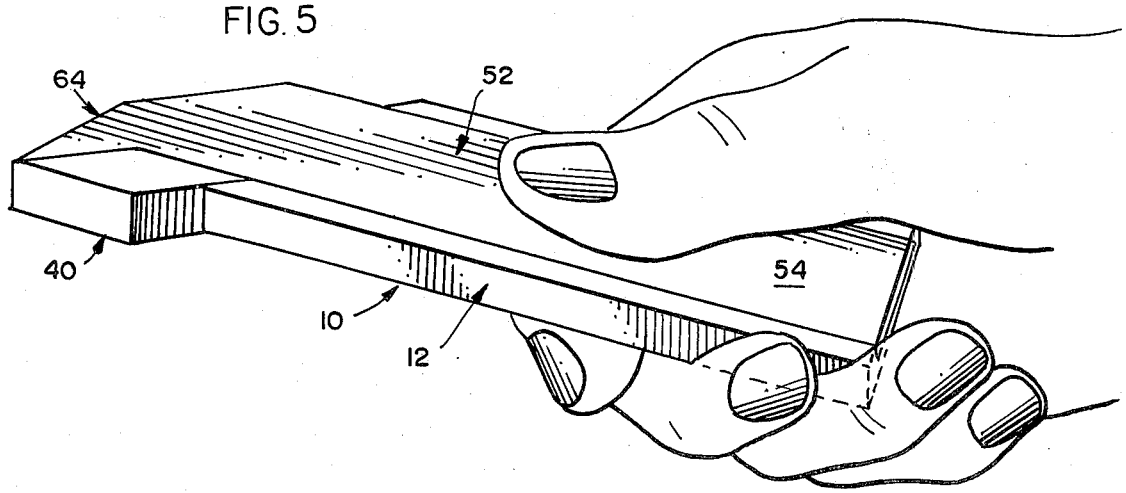
Figure 6:
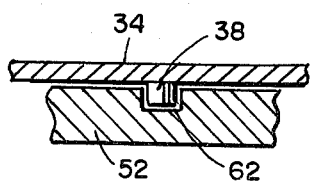
Figure 7:
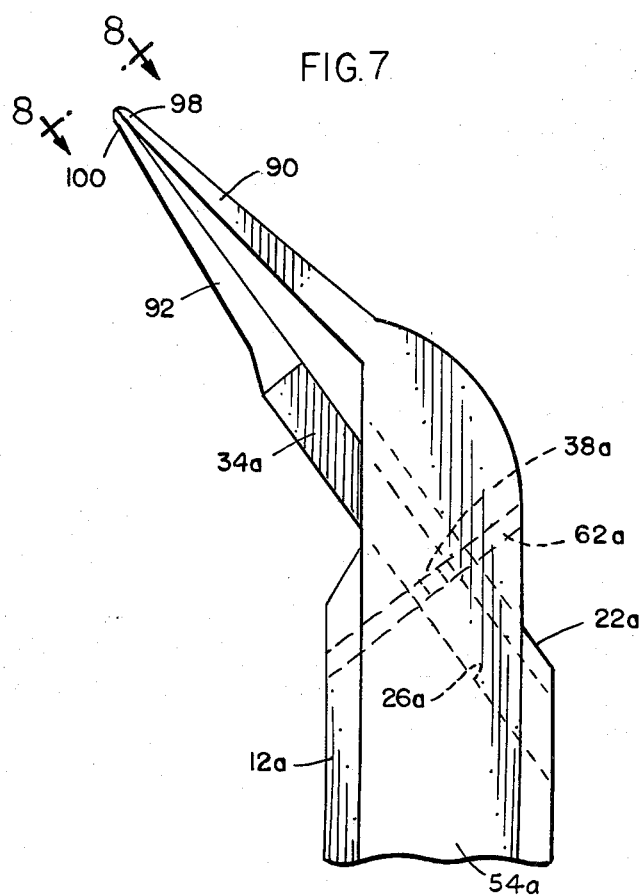
Figure 8:
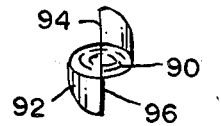
Figure 9:
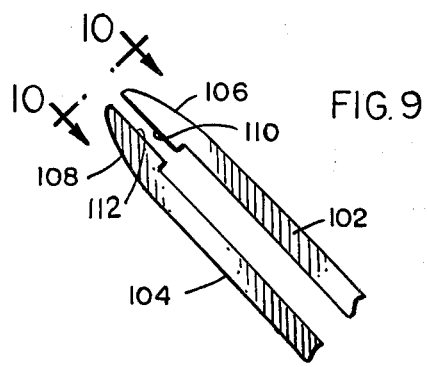
Figure 10:
Figure 11:
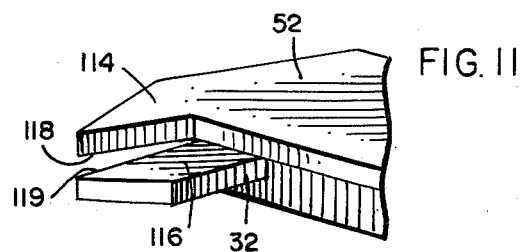
Figure 12:
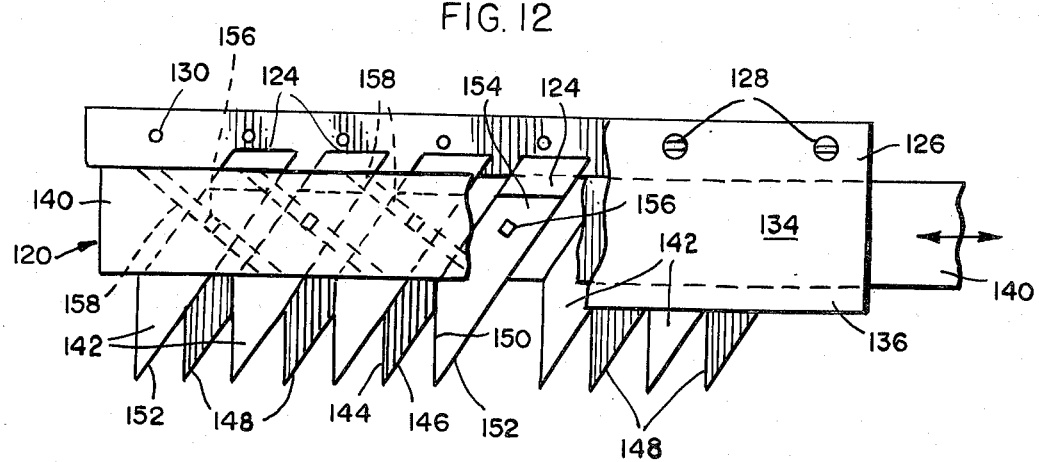
Figure 13:
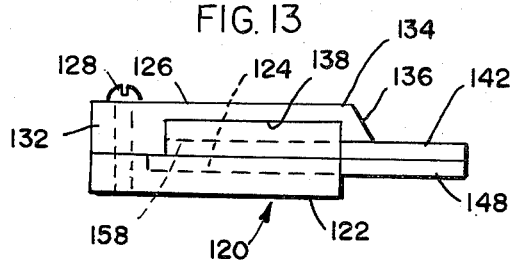

FIGS. 3 and 4 respectively are exploded, front and rear plan views of said wrench species;

FIG. 5 is a perspective illustration of the mode of holding by hand said wrench species;

FIG. 6 is a fragmentary, cross-sectional detail of the slot and pin articulation components in the two jaw-bearing members;

FIG. 7 is a side elevation of a sharp nosed surgical scissors;

FIG. 8 is a front view of the nose of the surgical scissors of FIG. 7 as viewed from section 8—8 of FIG. 7;

FIG. 9 is a fragmentary, side elevation of a surgical clamp structure which may be used in the surgical tool of FIG. 7;

FIG. 10 is a front view of the surgical clamp segment of FIG. 9 as viewed from section plan 10—10 of the latter;

FIG. 11 is a fragmentary, perspective view of a shear or scissors embodiment;

FIG. 12 is a top plan view, partially in fragment, of a shearing mechanism useful in power-operated grass trimmers, hedge trimmers and the like;

FIG. 13 is an end elevation of the shearing mechanism of FIG. 11; and

Figures 14, 15:
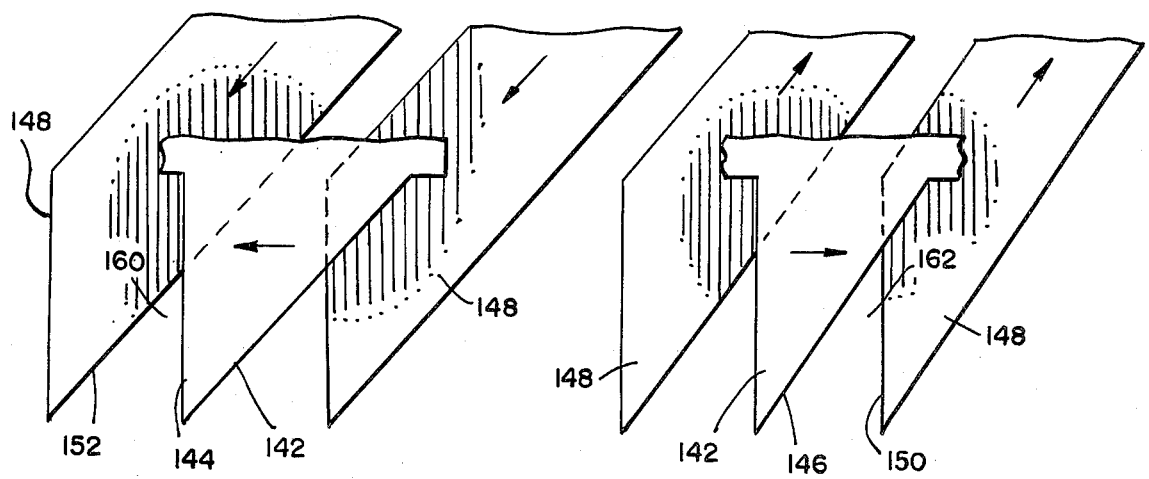

FIGS. 14 and 15 are fragmentary, enlarged, plan view details of the respective reciprocal motions of the shear blades of the mechanism of FIG. 13.

THE ILLUSTRATED EMBODIMENT

Referring to the drawings, the illustrated embodiment of FIGS. 1–6 is an embodiment of a gripping device particularly useful as a hand wrench for gripping and turning pipe, nuts, hex- and square-headed bolts and the like. As will be seen from the drawings, this wrench has a uniquely different appearance from the conventional adjustable crescent wrenches, pipe wrenches, etc. It is contemplated, however, that the inventive concepts can be utilized in many different forms of gripping devices.

The illustrated gripping device 10 is a hand wrench having a base 12 which will function as a handle as well as a track for one of the jaw-bearing members. As illustrated, it has a rectangular cross section, which cross section may also be round, oval, truncated oval or round, etc.

The base 12 has a slide track formed by the dovetail groove 14 having a flat bottom wall in the outer surface 16 thereof. The jaw-remote end of the base 12 is a squared end 18. The gripper end 20 of the base is formed by a diagonal or mitered end wall 22 and an intersecting, shorter end wall 24 at right angles to the former wall.

The base 12 further contains a rectangular groove or slot 26 in the outer surface 16, which groove or slot is deeper than the dovetail slot or groove 14 and which extends diagonally across the flat bottom wall of the slot or groove 14 in the base 12 substantially parallel with the end wall 22. A portion or segment 28 of the slot or groove 26 forms an aperture through the side edge 30 of the base 14.

A jaw-bearing member 32 comprises a slide bar 34 of rectangular, transverse cross section. The latter preferably has a diagonal end 36 parallel and coterminal with the face of the side edge 30 when the wrench is in fully closed position (FIG. 5). A pin or boss 38 projects from a face of the bar 34. Its function is described below.

The jaw head 40 of the jaw-bearing member 32 has a planar gripping face 42 and a stop face or side 44, said faces constituting two sides of the diamond segment 46 on one side of the jaw head 40. The opposite side of the jaw head is a pentagonal segment 48, the square end 50 of which forms a stop face.

The other jaw-bearing member 52 comprises a slide bar 54 having a regular trapezoidal, transverse cross section formed by the diagonally bevelled sides 56, 58. The wider, flat face 60 of the slide bar 54 opposes the flat bottom wall of the groove or slot 14 and has a diagonal groove or slot 62. When the wrench is assembled, the pin or boss 38 is seated in and rides along the diagonal groove or slot 62.

For wrench applications, the slot or groove 62 preferably is at right angles to the slot or groove 26. Further, the slot or groove 62 extends at an angle of about 60° ± 5° relative to the longitudinal axis of the slide bar 34 (also the linear direction of movement of the jaw-bearing member 52). The slot or groove 26 extends at an angle of about 30° ± 5° relative to the longitudinal axis of its slide track 14 (also the linear direction of movement of the jaw-bearing member 52). With these angular orientations, the jaw-bearing members of the wrench interlock and retain their gripping position about nuts, pipes, bolt heads, etc. without auxiliary or supplemental locking structures. The latter, however, may be incorporated into the subject gripping devices as adjunct structures without departing from the spirit or scope of the invention.

The other jaw head 64 on the jaw-bearing member 52 has a gripping face 66 which is planar and substantially parallel to and substantially directly opposite the gripping face 42 in all adjusted positions of the wrench. It is contemplated, however, that the gripping faces 42 and 66 may take any other suitable form, e.g., transversely, longitudinally and/or diagonally serrated faces; smooth or serrated faces of longitudinally concave or convex shape; non-parallel faces; and the like. Some of these alternative configurations are illustrated in the aforecited U.S. Patents.

The jaw head 64 further has a diagonal side whereby the jaw head has, in plan view, a roughly triangular configuration. The geometric shapes of the jaw heads 40 and 64, however, may take any other suitable overall configuration.

The jaw head 64 has an offset side or face 70 in the base portion thereof. A right angle notch 72 is formed as the juncture of the offset face or wall 70 and the gripping face 66. The face or wall 70 is substantially parallel to the diagonal end wall 22 of the base 20 and functions as an abutment stop which strikes the diagonal wall 22 with the wrench in fully closed position. The notch 72 substantially matingly fits, with the wrench is closed position, at the corner formed by the diagonal end walls 22, 24 on the base 12.

The jaw head 64 further includes a diagonal end wall 74. The squared side 76 of the bar 60 forms an unbevelled, recessed segment at the jaw-bearing end of the bar and functions as an abutment stop for the face 44 of the jaw head 40 when the wrench is closed.

The three parts of the wrench (FIGS. 3 and 4) are assembled by fitting the slide bar 54 into the track 14 and sliding same until the end 78 of the slot or groove is just outside the end of the slot or groove 26 at the diagonal end 24. The end 80 of the slide bar 34 is slipped into the slot or groove 26 to a point where the pin or boss 38 is aligned with the end 78 of the slot or groove 62. The jaw-bearing members are thereafter moved toward wrench-closed position to attain the assembly. In such assembly, the slide bar 54 slides over the slide bar 34 when the jaw bearing members are articulated by imparting sliding movement to the slide bar 54.

After the assembly, a setscrew or other stop device 82 may be mounted in the slide bar 54 so that the tip thereof projects into the slot or groove 62. This prevents accidental disassembly of the wrench, the boss or pin 38 being stopped by the setscrew.

For long reach retrieval devices, the same structures may be used. The base 12 is attached to a long handle, fixed or telescoping. A rod, stiff wire, etc. is attached to the jaw-bearing member 52 and extends longitudinally down the handle. Instead of articulation by thumb pressure on the exposed, flat face or side of the slide bar 54, the rod or wire is moved to open and close the jaws.

FIGS. 7–10 illustrate surgical tool applications of the articulation structures heretofore described. Where applicable, like references followed by the letter a designate like parts with reference to the embodiment of FIGS. 1–6.

The surgical tool of FIG. 7 is a sharp nosed scissors. The embodiment differs principally from the wrench embodiment of FIGS. 1–6 in the substitution of sharp nosed blades 90, 92 which have actual or approximate contact between the shearing faces 94 and 96 (FIG. 8). The illustrated embodiment is one designed for cutting in scissors-like fashion relatively deeply within an incision. For this purpose, the blades 90, 92 are thin, long blades which converge in a direction toward the relatively sharp nosed tips 98, 100 thereof. Contrary to the usual scissors-type cutting action, the blades 90, 92 begin their scissors-like cutting action at the tips 98, 100 rather than at the base portions.

The surgical clamp of FIGS. 9 and 10 is of similar structure to the surgical scissors of FIGS. 7 and 8. The surgical clamp utilizes, instead of the blades 90, 92, thin, elongated, substantially semi-cylindrical probes 102, 104 having tapered ends 106, 108. The tapered ends have opposed, raised, clamping faces which may be planar, parallel faces 110, 112. This tool enables deep probe clamping during surgery of veins, arteries, etc.

The surgical tools of FIGS. 7–10 enable the surgeons or surgical assistant to sever, clamp, etc. small parts of the human body or an animal body in the case of veterinarians deep within the surgical incision. When appropriately modified, the surgical clamp of FIG. 9 could be used to grip and retrieve foreign objects deep within a body, bullets or other metal objects, wood splinters, etc.

The slots or grooves 26a, 62a of these embodiments may be positioned at any angle relative to the longitudinal axis of movement of the blade-bearing member 54a. Preferably these slots or grooves are at 90° relative to each other. The 30°, 60° angles used in the wrench embodiments of FIGS. 1–6 are not as critical for the surgical tools inasmuch as relative movement of the blades 90, 92 and probes 102, 104 is relatively slight as compared with wrench jaw movements. Further, the three components making up the surgical tools of FIGS. 7–10 (12a, 34a and 54a) need not be interlocked against accidental disassembly, e.g., the setscrew 82 of FIGS. 1–6, in view of the slight relative movement of the blades or probes during surgical use. The pin or boss 38a remains substantially centered in the slot or groove 62a during surgical use. Further, it is preferred to make the three components readily separable so that each can be surgically sterilized prior to assembly for surgical use.

The embodiment of FIG. 11 illustrates a scissors or shears adaptation of the invention. It is identical in parts and components with the embodiment of FIGS. 1–6, with the exception that the jaws of the latter embodiment are modified in thickness and orientation to provide a shear blade 114 on the member 52 and a shear blade 116 on the member 32. Upon movement of the blade-bearing member 52, the diverging shearing edges 118, 119 of the blades 114, 116 exert a scissors-like shearing action on objects in the V-space therebetween.

Referring to FIGS. 12–13, this embodiment illustrates adaptation of the articulation system of the subject invention in a multi-cutting blade use, e.g., the shearing blades of a power driven grass or shrub trimming tool. The blade member 120 comprises three component parts: a lower, fixed, base member or bar 122 with diagonal grooves or slots 124 of rectangular cross section in the upper face thereof; an upper, blade-retaining member 126 having a base strip 132 separably attached to the base member or bar 122, bolts 128 threaded into tap holes 130, and a thinner strip 134 with edge lip 136 forming a downwardly facing cavity 138; and a reciprocable blade-bearing bar 140 longitudinally, slidably received in the cavity 138 and resting on the upper face of the base member or bar 122.

The blade-bearing member 140 is reciprocally driven as indicated by the double headed arrow of FIG. 12 by a power drive (not shown), which may be an electric motor or an internal combustion motor with a reciprocal drive unit. The blade-bearing member 140 has projecting from one side thereof a plurality of triangular cutting teeth 142, the two projecting triangular sides of which form scissors-like cutting edges 144, 146.

The teeth 142 coact with respective triangular lower cutting teeth 148 lying below the spaces between the cutting teeth 142. The opposed faces of the cutting teeth 142, 148 are in actual or approximate contact to give the shearing action as the cutting teeth reciprocate relative to each other.

The cutting teeth 148 also have two cutting edges 150, 152 along the projecting sides of their respective triangles. The teeth 148 are formed by triangular ends of the reciprocating bars 154 which are seated in and slide in and out of the diagonal slots or grooves 124. The bars 154 each has on the upper face a pin or boss 156 which slides in diagonal slots or grooves 158 in the underside of the bar 140. The latter has been partially broken away in FIG. 12 to better illustrate the details of the embodiment.

The respective angles of the slots or grooves 124 and slots or grooves 158 relative to the longitudinal axis of the bar 140 may be chosen, if desired. In the illustrated embodiment, each is at an angle of about 45° relative to said longitudinal axis. Preferably such slots or grooves have an angular relationship to each other in the order of 90°, e.g., 80° to 100°. As the bar 140 is reciprocated, its teeth 142 reciprocate in the longitudinal direction of the bar. Via the pin or boss 156 and slot or groove 158, each bar 154 is simultaneously reciprocated in the diagonal direction of the respective slots or grooves 124. This moves the teeth 148 at an angle to the longitudinal axis of the bar 140. Pairs of teeth 142 and 148 pass over and under each other in opposite directions to provide a shearing action between teeth edges 144 and 152 and then between teeth edges 146 and 150. This shearing action is a compound shearing action in two respects: (a) shearing is obtained in both directions of reciprocal movement of the bar 140 and (b) the coacting cutting edge pairs have relative movement not only in the longitudinal direction of reciprocation of the bar 140 but also in the direction of the angle of reciprocal movement of the bars 154.

As with the previous embodiments, the multiple blade shearing mechanism of FIGS. 12 and 13 comprises three basic component parts which can be readily assembled and/or disassembled for repair, lubrication or maintenance.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A hand wrench comprising a handle for said wrench having a longitudinal groove in an outer surface thereof, said groove having a flat bottom wall, a first slide bar having a wrench jaw head at one end thereof which projects beyond the handle, said first slide bar being slidably mounted in said longitudinal groove and having a flat face opposing said flat bottom wall, said handle having at one end thereof a second groove extending diagonally at an angle of 30° ± 5° to the longitudinal axis of said first slide bar, said second groove extending across and being deeper than said first groove, a second slide bar slidably mounted in said second groove, said second bar having a wrench jaw head at an end thereof which projects beyond said handle, said first bar sliding over said second bar, said flat face of said first bar having a straight slot extending diagonally therein substantially at a right angle relative to said second groove, said second bar having a pin projecting into and slidably riding in said slot, and the first bar having an exposed side adapted for thumb engagement for imparting longitudinal sliding movement thereof in said handle to articulate movement of said first and second jaw bearing members simultaneously toward or away from said end of said handle.

2. A hand wrench as claimed in claim 1, wherein said jaw heads have respective, opposed, gripping faces, said faces being substantially parallel with said second groove.

\* \* \* \* \*